US012420407B2

(12) United States Patent
Kaneko et al.

(10) Patent No.: US 12,420,407 B2
(45) Date of Patent: Sep. 23, 2025

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Toshimitsu Kaneko, Kawasaki (JP); Kenichi Shimoyama, Ota (JP); Tatsuya Tanaka, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 741 days.

(21) Appl. No.: 17/446,310

(22) Filed: Aug. 30, 2021

(65) Prior Publication Data

US 2022/0134545 A1 May 5, 2022

(30) Foreign Application Priority Data

Nov. 5, 2020 (JP) ................................ 2020-185041

(51) Int. Cl.
*B25J 9/16* (2006.01)
*G05B 13/02* (2006.01)

(52) U.S. Cl.
CPC .......... *B25J 9/163* (2013.01); *G05B 13/0265* (2013.01)

(58) Field of Classification Search
CPC ................. B25J 9/163; G05B 13/0265; G05B 2219/45063; G05B 2219/40607
See application file for complete search history.

(56) References Cited

U.S. PATENT DOCUMENTS

2020/0259842 A1* 8/2020 Kitano .................... G06F 21/57
2021/0129319 A1* 5/2021 Kaneko .................... B25J 9/161
2023/0045519 A1* 2/2023 Li ........................ G06V 10/454

FOREIGN PATENT DOCUMENTS

JP 2006-309519 A 11/2006
JP 2014-211667 A 11/2014
JP 2021-070136 A 5/2021
(Continued)

OTHER PUBLICATIONS

Lin et al., "Invariant Transform Experience Replay: Data Augmentation for Deep Reinforcement Learning", arxiv:1909.10707, 2019, 11 Pages (Year: 2020).*
(Continued)

*Primary Examiner* — Thomas E Worden
*Assistant Examiner* — Elizabeth Rose Neleski
(74) *Attorney, Agent, or Firm* — Oblon, McClelland, Maier &Neustadt, L.L.P.

(57) ABSTRACT

An information processing device includes processing circuitry. The processing circuitry is configured to acquire one or more pieces of first state information representing a state of each of one or more second subjects related to a first subject to be a subject of inference at first time, and one or more pieces of second state information representing a state of each of the one or more second subjects at second time; and generate learning data for use in reinforcement learning of a machine learning model for use in inference. The learning data includes the first state information at least part of which is replaced with any of the one or more pieces of the second state information, and the second state information at least part of which is replaced with any of the one or more pieces of the first state information.

14 Claims, 9 Drawing Sheets

(56) References Cited

FOREIGN PATENT DOCUMENTS

| | | | |
|---|---|---|---|
| WO | WO 2019/222734 | A1 | 11/2019 |
| WO | WO 2020/070876 | A1 | 4/2020 |

OTHER PUBLICATIONS

Lin et al., "Invariant Transform Experience Replay: Data Augmentation for Deep Reinforcement Learning", arxiv:1909.10707, 2019, 11 pages.
Mnih et al., "Human-level control through deep reinforcement learning" Nature, vol. 518, 2015, 13 pages.
Japanese Office Action dated Sep. 3, 2024, issued in Japanese Patent Application No. 2020-185041 (with English translation).

* cited by examiner 100
101
102
103
103
103
103
110
111
120
130
140
150
160
161
162
170
171
172
180

TIME t
TIME t+1
STARTING LOCATION
MOVING DESTINATION
STARTING LOCATION
MOVING DESTINATION
501-3
501-4
501-5
501-6
501
502-3
502-4
502-5
502-6
502
160
170
512
513
514

TIME t
TIME t+1
STARTING LOCATION
MOVING DESTINATION
STARTING LOCATION
MOVING DESTINATION
501-3
501-4
503-3
503-4
160
170
512
513
514
501
501-5
501-6
503
503-5
503-6

TIME t
TIME t+1
STARTING LOCATION
MOVING DESTINATION
STARTING LOCATION
MOVING DESTINATION
501-3
501-4
501-5
501-6
501
504-3
504-4
504-5
504-6
504
160
170
512
513
514

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-185041, filed on Nov. 5, 2020; the entire contents of which are incorporated herein by reference.

FIELD

Embodiments described herein relate generally to an information processing device, an information processing method, and a computer program product.

BACKGROUND

Reinforcement learning intends to learn optimal actions and policies through repetitions of trials and errors. In this regard, there has been a demand for improvement in learning efficiency with respect to the number of tries for an action. A technique of improving learning efficiency in robotic motion learning is proposed, which augments data by converting experience data obtained through one try into a plane-symmetric coordinate system.

Conventionally, however, augmented data may not be suitable for use in learning, so that improvement in learning efficiency is not attainable. For example, consider that a robot is caused to learn a motion of grasping an object in a container and packing the object in another container. In such a case, through data augmentation by plane-symmetric coordinate conversion, data in which a starting location and a moving destination of the object is replaced with each other is obtained. In typical packing work, however, the starting location and the moving destination will be never reversed, therefore, the augmented data is not suitable for use in reinforcement learning.

It is preferable to provide an information processing device, an information processing method, and a computer program product that can achieve improvement in learning efficiency.

DETAILED DESCRIPTION

According to one embodiment, an information processing device includes processing circuitry. The processing circuitry is configured to acquire one or more pieces of first state information and one or more pieces of second state information, the first state information representing a state of each of one or more second subjects at first time, the second subjects related to a first subject to be a subject of inference, the second state information representing a state of each of the one or more second subjects at second time; and generate learning data for use in reinforcement learning of a machine learning model for use in the inference. The learning data includes the one or more pieces of first state information at least part of which is replaced with any of the one or more pieces of the second state information, and the one or more pieces of second state information at least part of which is replaced with any of the one or more pieces of first state information.

The following will describe embodiments of an information processing device according to this disclosure in detail with reference to the accompanying drawings.

First Embodiment

An information processing device according to a first embodiment augments data by replacing a starting location of an object with a moving destination of the object, and replacing states of a container before and after movement. The information processing device then uses the augmented data to learn a grasp position and pose as well as a packing position and pose with respect to the object. By augmenting data in this manner, the information processing device can generate two or more pieces of experience data for use in reinforcement learning from a single object grasping and packing motion. Thereby, the information processing device can improve learning efficiency.

The first embodiment will mainly describe a robot system that controls a robot having a function of grasping and moving an article (an exemplary object) and packing the article in a container (an exemplary moving destination).

The information processing device according to the first embodiment is used in learning a policy for deciding both of the grasp position and pose and the packing position and pose) with respect to the object. This makes it possible to efficiently learn an efficient packing policy with a higher occupancy rate and a less packing time to be executable by the robot. For example, the expression “to be executable by the robot” signifies that the robot can pack the object without interfering with the container and another object.

Figure 1:
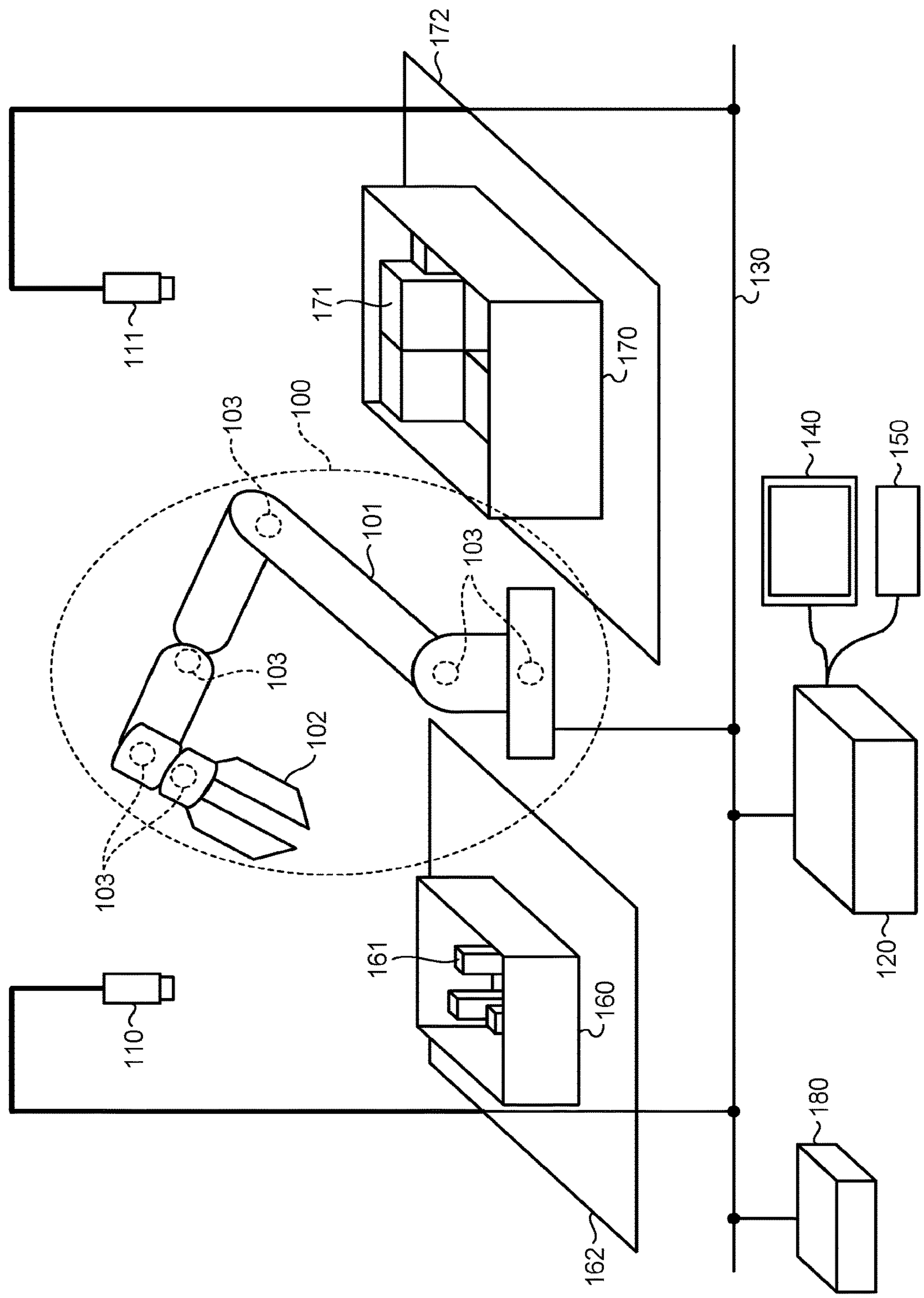
FIG. 1 is a configuration diagram of a robot system according to a first embodiment.

FIG. 1 is a diagram illustrating an exemplary configuration of a robot system including an information processing device 120 of the first embodiment. As illustrated in FIG. 1, the robot system of the present embodiment includes a robot 100, a generator 110, a generator 111, the information processing device 120, a network 130, a display 140, an input 150, a container 160, a container 170, and a simulator 180.

The robot 100 includes a function of moving an object 161 to be packed from the container 160 to the container 170. The robot 100 can include a multi-joint robot, an orthogonal robot, or a combination thereof. In the following the robot 100 is exemplified by a multi-joint robot including a multi-joint arm 101, an end effector 102, and a plurality of actuators 103.

The end effector 102 is attached to a distal end of the multi-joint arm 101 to move an object (for example, an article). The end effector 102 is, for example, a gripper capable of grasping the object, or a vacuum-type robotic hand. The multi-joint arm 101 and the end effector 102 are controlled in accordance with driving of the actuators 103. Specifically, the multi-joint arm 101 moves, rotates, extends, or contracts (that is, change in angle between the joints) in accordance with driving of the actuators 103. The end effector 102 grasps (grips or suctions) the object and cancels or releases grasping in accordance with driving of the actuators 103.

The information processing device 120 controls a motion of the robot 100. The information processing device 120 may be implemented as a computer or a dedicated control device for controlling the motion of the robot 100, for example. A function of the information processing device 120 will be described in detail later.

The network 130 serves to mutually connect constituent elements such as the robot 100, the generator 110, the generator 111, and the information processing device 120. Examples of the network 130 include a local area network (LAN) and the Internet. The network 130 may be either a wired network or a wireless network. The robot 100, the generator 110, the generator 111, and the information processing device 120 can transmit and receive data (signals) via the network 130. The data may be transmitted and received not via the network 130 but via a direct wired connection or a wireless connection between the components.

The display 140 is a device that displays information for use in various kinds of processing performed by the information processing device 120. The display 140 is, for example, constituted of a display device such as a liquid crystal display (LCD). The display 140 may display settings as to the robot 100, a state of the robot 100, and a working status of the robot 100, for example.

The input 150 is an input device including a keyboard and a pointing device such as a mouse. The display 140 and the input 150 may be incorporated into the information processing device 120.

The robot 100 performs work of grasping an object placed in the container 160 (first container) and packing the object in the container 170 (second container). The container 170 may be empty or may contain an object 171 previously packed. The container 160 is for use in storing or moving articles in a warehouse, for example. The container 170 is for use in shipping purposes, for example. Examples of the container 170 include a corrugated box and a conveyance palette.

The container 160 and the container 170 are placed on a workbench 162 and a workbench 172 respectively. The container 160 and the container 170 may be placed on a movable conveyor belt. In this case, the container 160 and the container 170 are placed in an area in which the robot 100 is operable in accordance with the movement of the conveyor belt.

Alternatively, at least one of the container 160 and the container 170 may not be used, and the object 161 and/or the object 171 may be directly placed in a working area (an exemplary moving destination) such as a conveyor belt or a dolly, for example.

In the present embodiment, the robot 100 is set to a subject of inference. For example, a grasp position and pose and a packing position and pose are inferred as the motion of the robot 100. In this case, a subject related to the robot 100 is, for example, a region as the starting location (first region) of the object 161 and a region as the moving destination (second region). The subject related to the robot 100 can also be interpreted as an object that may affect (the motion of) the robot 100. The container 160 and the container 170 are examples of the region as the starting location and the region as the moving destination, respectively. As described above, the first region or the second region may be set to the working area such as a conveyor belt or a dolly.

The generator 110 serves to generate state information representing an inner state of the container 160 (state information about the first region). The generator 111 generates state information representing a state of the moving destination of the object 161 (state information about the second region). The generator 110 and the generator 111 can be, for example, cameras that generate images or range sensors that generate depth images (depth data). The generator 110 and the generator 111 may be installed in an environment including the robot 100 (for example, on a pillar in a room or on a ceiling) or may be attached to the robot 100.

In using three-dimensional coordinates including an XY-plane being a plane parallel to the workbench 162 and a Z-axis being a direction perpendicular to the XY-plane, a camera that captures images in a direction parallel to the Z-axis is used to generate image, for example. A distance sensor that ranges in a direction parallel to the Z-axis is used to generate depth images, for example. The depth image refers to, for example, information representing a Z-axial depth value at each position (x, y) on the XY-plane.

For example, the generator 110 generates state information by observing an inner state of at least part of the container 160. The state information includes at least one of the depth image and the inside image of the container 160, for example.

The generator 111 generates, for example, state information by observing an inner state of at least part of the container 170. The state information includes at least one of the depth image and the inside image of the container 170, for example.

The generator 110 and the generator 111 may be united into one generator. In this case, the one generator serves to generate both the state information of the container 160 and the state information of the container 170. Alternatively, three or more generators may be provided.

The information processing device 120 creates at least one motion plan for grasping, moving, and packing one of the objects 161 in the container 170 based on the state information generated by the generator 110 and the generator 111. The information processing device 120 transmits a control signal to the actuators 103 of the robot 100 in accordance with the created motion plan, to thereby cause the robot 100 to move.

The simulator 180 serves to simulate the motion of the robot 100. The simulator 180 is implemented as an information processing device such as a computer, for example, and used in learning and evaluating the motion of the robot 100. The robot system may not include the simulator 180.

Figure 2:
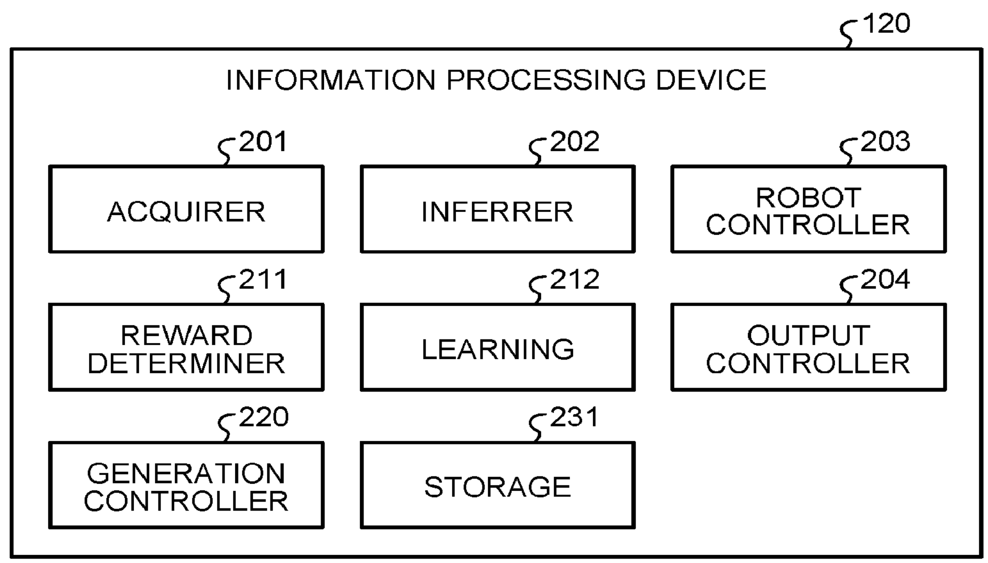
FIG. 2 is a block diagram of an information processing device.

FIG. 2 is a block diagram illustrating an exemplary functional configuration of the information processing device 120. As illustrated in FIG. 2, the information processing device 120 includes an acquirer 201, an inferrer 202, a robot controller 203, an output controller 204, a reward determiner 211, a generation controller 220, a learning 212, and a storage 231.

The acquirer 201 serves to acquire various kinds of information for use in various kinds of processing to be performed by the information processing device 120. For example, the acquirer 201 acquires or receives the state information from the generator 110 and the generator 111 via the network 130.

Hereinafter, the state information acquired from the generator 110 and the generator 111 at first time is referred to as first state information. The state information acquired from the generator 110 and the generator 111 at second time after the first time is referred to as second state information. In the present embodiment, the state information is acquired from the two generator 110 and generator 111, so that the first state information and the second state information are each two sets of information.

The acquirer 201 outputs the acquired state information to the inferrer 202 and the reward determiner 211. The acquirer 201 may output the acquired state information as it is, or may perform processing such as resolution conversion, frame rate conversion, clipping, and trimming to the acquired state information for output. In the following, the state information of the first region at time t acquired from the generator 110 is denoted by $s^{(1)}_t$, and the state information of the second region at time t acquired from the generator 111 is denoted by $s^{(2)}_t$.

When time t is defined as first time and time t+1 is defined as second time, the state information $s^{(1)}_t$ of the first region and the state information $s^{(2)}_t$ of the second region at time t both correspond to the first state information. State information $s^{(1)}_{t+1}$ of the first region and state information $s^{(2)}_{t+1}$ of the second region at time t+1 both correspond to the second state information.

The inferrer 202 serves to determine or infer a grasp position and pose $a^{(1)}_t$ of the robot 100 in grasping the object 161 in the container 160, and a packing position and pose $a^{(2)}_t$ of the robot 100 in packing the object 161 in the container 170, from the state information $s^{(1)}_t$ and the state information $s^{(2)}_t$ at time t. The inferrer 202 can infer such positions and poses using various reinforcement learning algorithms. For example, in inferring by deep Q-network (DQN), the inferrer 202 inputs, to an action value function $Q(s_t, a_t)$ configured by a neural network, a state $s_t=(s^{(1)}_t, s^2)_t)$ obtained by concatenating the state information $s^{(1)}_t$ and the state information $s^{(2)}_t$, and decides an action $a_t$ by the following expression (1):

$$\underset{a_t}{\operatorname{argmax}}\{Q(s_t, a_t)\}. \tag{1}$$

The action $a_t$ corresponds to a combination of the grasp position and pose $a^{(1)}_t$ and the packing position and pose $a^{(2)}_t$ on a one-to-one basis. The grasp position and pose $a^{(1)}_t$ and the packing position and pose $a^{(2)}_t$ are determined from the action $a_t$.

The grasp position and pose $a^{(1)}_t$ represents orientation or inclination of the end effector 102 and coordinate values that specify a position of the end effector 102 at the time of grasping the object 161. The packing position and pose $a^{(2)}_t$ represents orientation or inclination of the end effector 102 and coordinate values that specify a position of the end effector 102 at the time of placing the object 161. The coordinate values that specify the position are represented by coordinate values in a predefined three-dimensional coordinate system, for example. Orientation or inclination is represented by a rotation angle about each axis of the three-dimensional coordinate system, for example.

A machine learning model for use in inferring by the inferrer 202 is not limited to the neural network, and may be any model as long as it can infer from similar input data. For example, the inferrer 202 may use a linear model as the machine learning model.

The robot controller 203 serves to control the robot 100 to grasp and pack the object 161 at positions and poses as planned, according to output information from the inferrer 202. For example, the robot controller 203 generates a control signal for causing the actuators 103 to perform operations as follows:

An operation of driving the robot 100 from a current state to grasp the object 161 in the grasp position and pose as planned by the inferrer 202;

An operation of driving the robot 100 to grasp the object 161;

An operation of driving the robot 100 to move the object 161 to the packing position and pose as planned by the inferrer 202;

A operation of driving the robot 100 to place the object 161; and

An operation of placing the robot 100 in a desired state after packing.

The robot controller 203 transmits the control signal to the robot 100 via the network 130, for example. The robot 100 performs the grasping and packing motion with respect to the object 161, driven by the actuators 103 in accordance with the control signal.

The output controller 204 serves to control output of various kinds of information for use in various kinds of processing performed by the information processing device 120. For example, the output controller 204 controls display of an output from the neural network on the display 140.

The reward determiner 211 serves to determine a reward value for use in reinforcement learning in accordance with desirability of a result of the motion of the robot 100. The reward determiner 211 determines the reward such that, as to a result of grasping and packing the object 161 in accordance with a plan input to the robot controller 203, a higher reward is given to a more desirable state and a lower reward is given to a less desirable state. For example, with respect to the robot 100 having succeeded in grasping and packing of the object 161, the reward determiner 211 determines a reward according to a volume or a weight of the object 161. The reward determiner 211 may determine the reward such that the shorter the working time of the robot to grasp and pack is, the higher the reward given is.

The reward determiner 211 determines a lower reward value (for example, a negative value) for an undesirable state as follows:

Failing in grasping the object 161;

Occurrence of collision or contact with the container 160, the container 170, or the object 171 while moving and packing the object 161; and Packing the object 161 in a position and pose different from the position and pose as planned.

In the following, the reward at time t is represented as $r_t$. The reward for the action at time t is decided at time t+1 from the state at time t+1, so that $r_t$ corresponds to the reward for the action at time t−1.

The generation controller 220 performs data generation to generate learning data (experience data) for use in reinforcement learning. For example, the generation controller 220 generates experience data from the state information of the first region and the state information of the second region acquired by the acquirer 201, the reward determined by the reward determiner 211, and the grasp position and pose and the packing position and pose determined by the inferrer 202.

In the present embodiment, the robot controller 203 causes the robot 100 to perform motion based on a result of the inference by the inferrer 202. The generation controller 220 generates not only experience data obtained from the motion of the robot 100 but also augmented data of the experience data. The generation controller 220 generates experience data including the first state information at least part of which is replaced with the second state information, and the second state information at least part of which is replaced with the first state information. An experience-data generation method by the generation controller 220 will be described in detail later.

The storage 231 stores various kinds of information for use in various kinds of processing performed by the information processing device 120. For example, the storage 231 stores the experience data generated by the generation controller 220. An upper limit may be set in advance to the number of pieces of experience data to be stored in the storage 231. When the number of pieces of experience data exceeds the upper limit, for example, the storage 231 stores new experience data after deleting part of the previously stored experience data. For example, the storage 231 deletes the experience data in order from the most previous one. In learning from accumulated experience data, a certain number of pieces of experience data are sampled at certain intervals by a predetermined method such as random sampling, and are output to the learning 212.

The storage 231 can include any general-purpose storage medium such as a flash memory, a memory card, a random access memory (RAM), a hard disk drive (HDD), and an optical disc.

The learning 212 serves to perform a learning process (reinforcement learning) of the machine learning model (neural network) for use by the inferrer 202. For example, the learning 212 uses the experience data sampled from the storage 231 to decide an update value of parameters of the neural network that the inferrer 202 uses. When the inferrer 202 performs inference using the neural network, the parameters correspond to a weight and a bias of the neural network. In reinforcement learning by the DQN, with respect to sampled experience data $x=(s_t, a_t, r_{t+1}, s_{t+1})$ the learning 212 decides the update value of each of the parameters by backpropagation using a loss function represented by the following expression (2):

$$L = \left(r_{t+1} + \gamma \max_{a_{t+1}} \{Q(s_{t+1}, a_{t+1})\} - Q(s_t, a_t)\right)^2 \quad (2)$$

where γ represents a value called a discount rate and max represents a function for obtaining a maximum value of Q-values calculated by varying $a_{t+1}$. The loss function is not limited to the expression (2).

The respective elements (i.e., the acquirer 201, the inferrer 202, the robot controller 203, the output controller 204, the reward determiner 211, the generation controller 220, and the learning 212) are implemented by one or two or more processors or processing circuitry, for example. The respective elements may be implemented by, for example, software, that is, by causing a processor such as a central processing unit (CPU) to execute a computer program. Alternatively, the respective elements may be implemented by hardware as a processor such as a dedicated integrated circuit (IC). The respective elements may also be implemented by a combination of software and hardware. In the case of using a plurality of processors, each of the processors may implement one or two or more of the respective elements.

Figure 3:
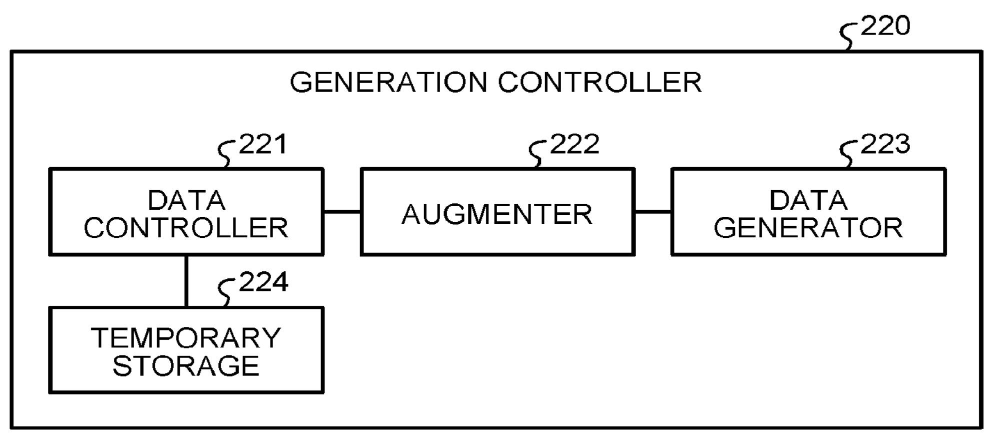
FIG. 3 is a block diagram of a generation controller.

Next, the following will describe processing of the generation controller 220 in detail. FIG. 3 is a block diagram illustrating an exemplary functional configuration of the generation controller 220. As illustrated in FIG. 3, the generation controller 220 includes a data controller 221, an augmenter 222, a data generator 223, and a temporary storage 224.

First, an example that the container 160 and the container 170 have the same size (the first region and the second region have the same size) is described.

The temporary storage 224 is a storage device that temporarily stores the state information and the grasp position and pose for use in generating the experience data. The temporary storage 224 can include any general-purpose storage medium such as a flash memory, a memory card, a RAM, an HDD, and an optical disc, as with the storage 231. The storage 231 may be configured to function as the temporary storage 224.

The experience data is generated when the information sufficient to generate the experience data is stored in the temporary storage 224. In the following, it is assumed that the temporary storage 224 store the state information $s^{(1)}_t$ of the first region, the state information $s^{(2)}_t$ of the second region, the grasp position and pose $a^{(1)}_t$, and the packing position and pose $a^{(2)}_t$ at time t.

The data controller 221 prepares necessary data for generating the experience data. First, the data controller 221 receives the state information $s^{(1)}_{t+1}$ of the first region and the state information $s^{(2)}_{t+1}$ of the second region at time t+1 from the reward determiner 211, and the grasp position and pose $a^{(1)}_{t+1}$ and the packing position and pose $a^{(2)}_{t+1}$ at time t+1 from the inferrer 202, to output them to the temporary storage 224.

Next, the data controller 221 reads the state information $s^{(1)}_t$ of the first region, the state information $s^{(2)}_t$ of the second region, the grasp position and pose $a^{(1)}_t$, and the packing position and pose $a^{(2)}_t$ at time t from the temporary storage 224. The data controller 221 combines the read pieces of information at time t with the pieces of information obtained at time t+1 (the state information $s^{(1)}_{t+1}$ of the first region, the state information $s^{(2)}_{t+1}$ of the second region, and a reward $r_{t+1}$ input from the reward determiner 211), to generate and output, to the augmenter 222, data $u_t$ for generating the experience data, as represented by the following expression (3):

$$u_t=(s^{(1)}_t, s^{(2)}_t, a^{(1)}_t, a^{(2)}_t, r_{t+1}, s^{(1)}_{t+1}, s^{(2)}_{t+1}) \quad (3)$$

Each term of the data $u_t$ signifies the following information:

First term: the state information of the first region at time t;

Second term: the state information of the second region at time t;

Third term: the grasp position and pose at time t;

Fourth term: the packing position and pose at time t;

Fifth term: the reward at time t+1;

Sixth term: the state information of the first region at time t+1; and

Seventh term: the state information of the second region at time t+1.

The augmenter 222 performs data augmentation for increasing the amount of the experience data to improve learning efficiency of reinforcement learning. The augmenter 222 first determines whether input data $u_t$ is augmentable. For example, the augmenter 222 determines the input data $u_t$ representing a successful grasping and packing as augmentable. The augmenter 222 determines the input data $u_t$ representing a failure in at least one of grasping and packing as non-augmentable. Determining whether data is augmentable can be interpreted as corresponding to determining whether at least part of the state information is replaceable.

With respect to the data $u_t$ determined as augmentable, the augmenter 222 can perform three kinds of data augmentation including $f_1$, $f_2$, and $f_3$ represented by the following expressions (4) to (6):

$$f_1(u_t)=(s^{(2)}_{t+1},s^{(1)}_{t+1},a^{(2)}_t,a^{(1)}_t,r_{t+1},s^{(2)}_t,s^{(1)}_t \quad (4)$$

$$f_2(u_t)=(s^{(1)}_t,s^{(1)}_{t+1},a^{(1)}_t,a^{(1)}_t,r_{t+1},s^{(1)}_t,s^{(1)}_t \quad (5)$$

$$f_3(u_t)=(s^{(2)}_{t+1},s^{(2)}_t,a^{(2)}_t,a^{(2)}_t,r_{t+1},s^{(2)}_t,s^{(2)}_{t+1} \quad (6)$$

With respect to the data $u_t$ determined as augmentable, the augmenter 222 outputs, to the data generator 223, the data $u_t$ before being augmented and at least one of pieces of augmented data $f_1(u_t)$, $f_2(u_t)$, and $f_3(u_t)$.

The data generator 223 serves to generate experience data x for use in reinforcement learning. When the data input from the augmenter 222 matches the data $u_t$ represented by the expression (3), the data generator 223 generates the experience data x represented by the following expression (7):

$$x=(s_t,a_t,r_{t+1},s_{t+1}) \quad (7)$$

where a state $s_t$ is represented as $s_t=(s^{(1)}_t, s^{(2)}_t)$, a state $s_{t+1}$ is represented as $s_{t+1}=(s^{(1)}_{t+1}, s^{(2)}_{t+1})$, and $a_t$ represents an action corresponding to a combination of $a^{(1)}_t$ and $a^{(2)}_t$. That is, the data generator 223 generates the experience data x from the input data in accordance with the following rules:

Defining data obtained by coupling the first term with the second term of the input data as the first term of the experience data;

Defining data obtained by coupling the third term with the fourth term of the input data as the second term of the experience data;

Defining the fifth term of the input data as the third term of the experience data; and Defining data obtained by coupling the sixth term with the seventh term of the input data as the fourth term of the experience data.

The data generator 223 can also generate the experience data of the pieces of augmented data $f_1(u_t)$, $f_2(u_t)$, and $f_3(u_t)$ in accordance with the rules described above.

The state information is defined as follows:

Third state information: the state information $s^{(1)}_t$ of the first region at time t;

Fourth state information: the state information $s^{(2)}_t$ of the second region at time t;

Fifth state information: the state information $s^{(1)}_{t+1}$ of the first region at time t+1; and Sixth state information: the state information $s^{(2)}_{t+1}$ of the second region at time t+1.

In this case, the data generator 223 generates the experience data with respect to each of the pieces of data $f_1(u_t)$, $f_2(u_t)$, and $f_3(u_t)$, as follows:

Data $f_1(u_t)$: experience data including the third state information replaced with the sixth state information, the fourth state information replaced with the fifth state information, the fifth state information replaced with the fourth state information, and the sixth state information replaced with the third state information;

Data $f_2(u_t)$: experience data including the fourth state information replaced with the fifth state information, and the sixth state information replaced with the third state information; and Data $f_3(u_t)$: experience data including the third state information replaced with the sixth state information, and the fifth state information replaced with the fourth state information.

The data generator 223 outputs the pieces of experience data as generated to the storage 231.

Figure 4:
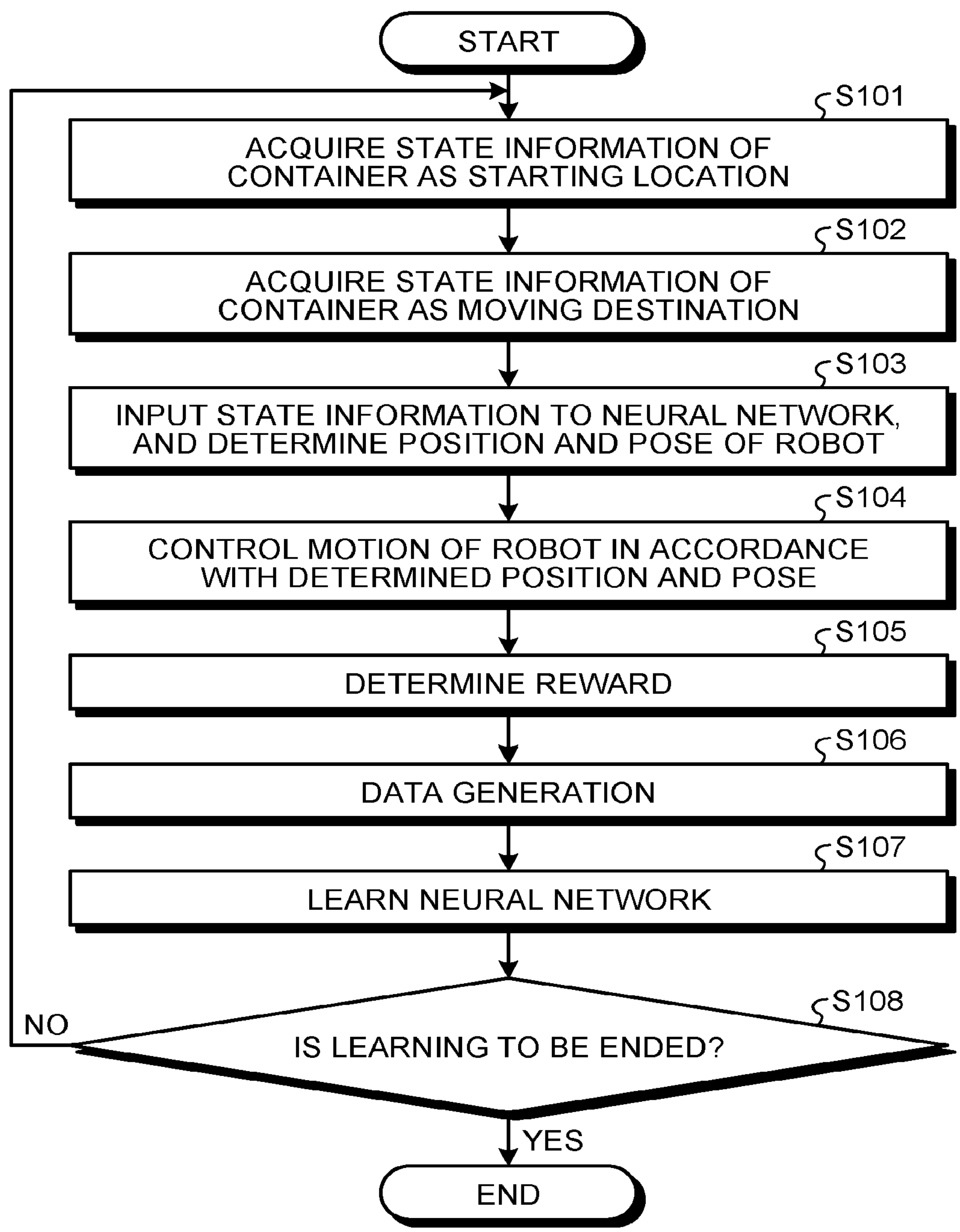
FIG. 4 is a flowchart of a learning process according to the first embodiment.

Next, the following will describe a learning process by the information processing device 120 of the first embodiment configured as above. FIG. 4 is a flowchart illustrating an exemplary learning process in the first embodiment.

The acquirer 201 acquires, from the generator 110, the state information $s^{(1)}_t$ of the container 160 as a starting location at time t (Step S101). The acquirer 201 acquires, from the generator 111, the state information $s^{(2)}_t$ of the container 170 as a moving destination at time t (Step S102).

The learning 212 inputs the pieces of state information $s^{(1)}_t$ and $s^{(2)}_t$ to the neural network that the inferrer 202 uses, and decides a grasp position and pose and a packing position and pose of the robot 100 from an output from the neural network (Step S103).

The robot controller 203 controls the motion of the robot 100 such that the robot 100 is in the grasp position and pose and the packing position and pose as decided (Step S104).

The reward determiner 211 determines a reward value from a result of the motion of the robot 100 (Step S105).

The generation controller 220 performs data generation to generate the experience data from the state information of the first region and the state information of the second region as acquired, the reward value as determined, and the grasp position and pose and the packing position and pose as decided through the procedure described above (Step S106).

The learning 212 updates a weight and a bias of a neural network by backpropagation (Step S107).

The learning 212 determines whether to end the learning (Step S108). For example, the learning 212 determines whether to end the learning depending on whether the value of the action value function has converged or whether the number of repetitions of learning has reached an upper limit value. After determining continuation of the learning (No at Step S108), the flow returns to Step S101, repeating the processing. After determining completion of the learning (Yes at Step S108), the learning 212 ends the learning process.

Figure 5:
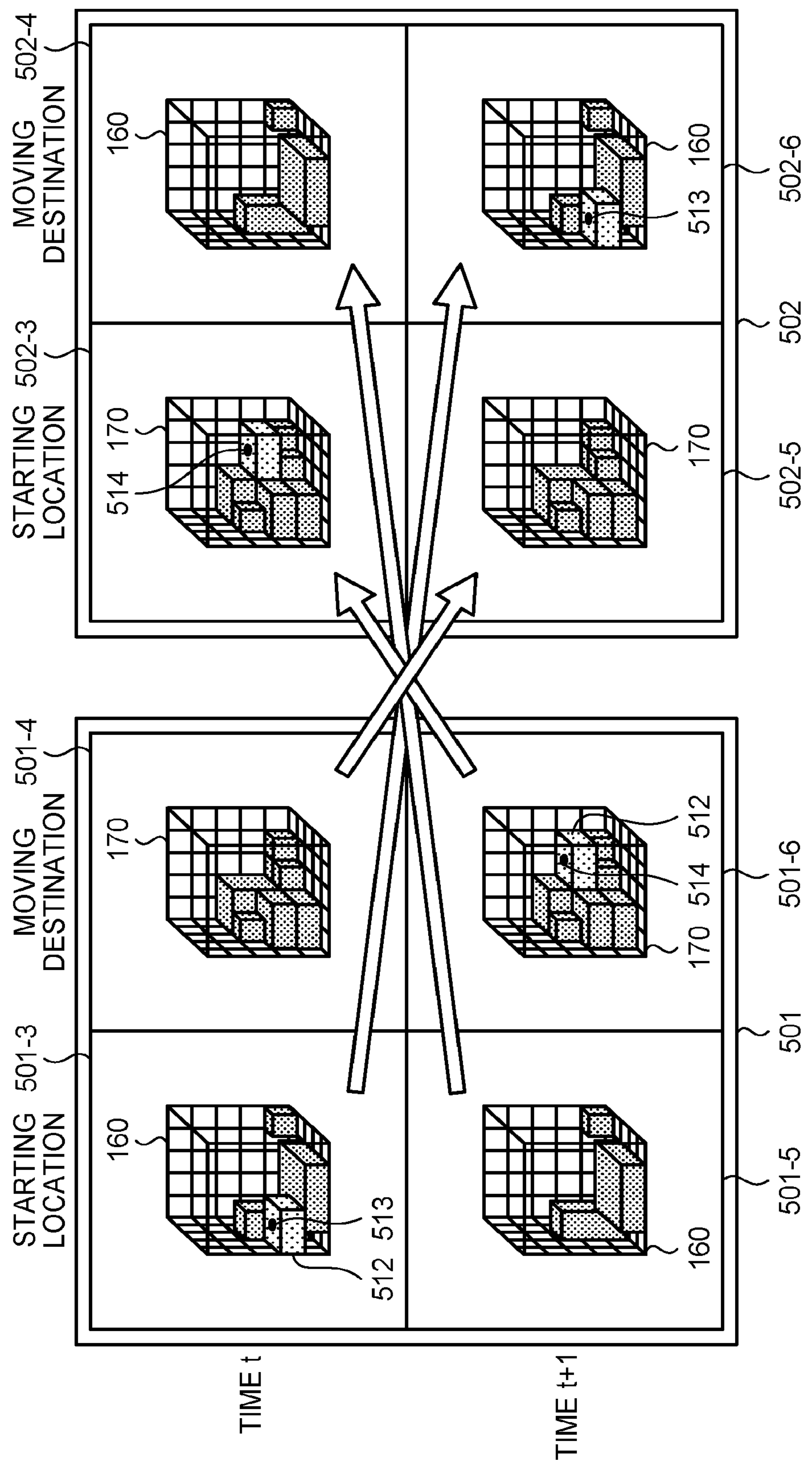
FIG. 5 is a diagram illustrating an example of augmented data.

Next, an example of the experience data to be generated will be described. FIG. 5 is a diagram illustrating an example of data augmented by data augmentation $f_1$. State information 501 in FIG. 5 represents states of a region as the starting location and a region as the moving destination at time t and time t+1.

Specifically, the state information 501 includes third state information 501-3, fourth state information 501-4, fifth state information 501-5, and sixth state information 501-6 as follows:

Third state information 501-3: a state of the region as the starting location (container 160) at time t;

Fourth state information 501-4: a state of the region as the moving destination (container 170) at time t;

Fifth state information 501-5: a state of the region as the starting location (container 160) at time t+1; and Sixth state information 501-6: a state of the region as the moving destination (container 170) at time t+1.

The state information 501 indicates that the robot 100 is placed in the state at time t+1 as a result of grasping an object 512 at a grasp position 513 at time t and packing the object 512 at a packing position 514.

State information 502 represents data obtained by augmenting the state information 501 by the data augmentation $f_1$. The state information 502 corresponds to the state information 501 with the times and the containers in each state both replaced. Specifically, the state information 502 includes third state information 502-3, fourth state information 502-4, fifth state information 502-5, and sixth state information 502-6 as follows:

Third state information 502-3: state information replaced with the sixth state information 501-6;

Fourth state information 502-4: state information replaced with the fifth state information 501-5;

Fifth state information 502-5: state information replaced with the fourth state information 501-4; and Sixth state information 502-6: state information replaced with the third state information 501-3.

Opposite to the state information 501, the state information 502 indicates that the robot 100 grasps the object 512 in the container 170 at the grasp position 514, and packs the object 512 in the container 160 at the packing position 513. The state information 502 contains simulation data of a state transition when the state of the container as the starting location (container 160) and the state of the container as the moving destination (container 170) are reversed in reality. Thus, the state information 502 can be used as the experience data in reinforcement learning.

Figure 6:
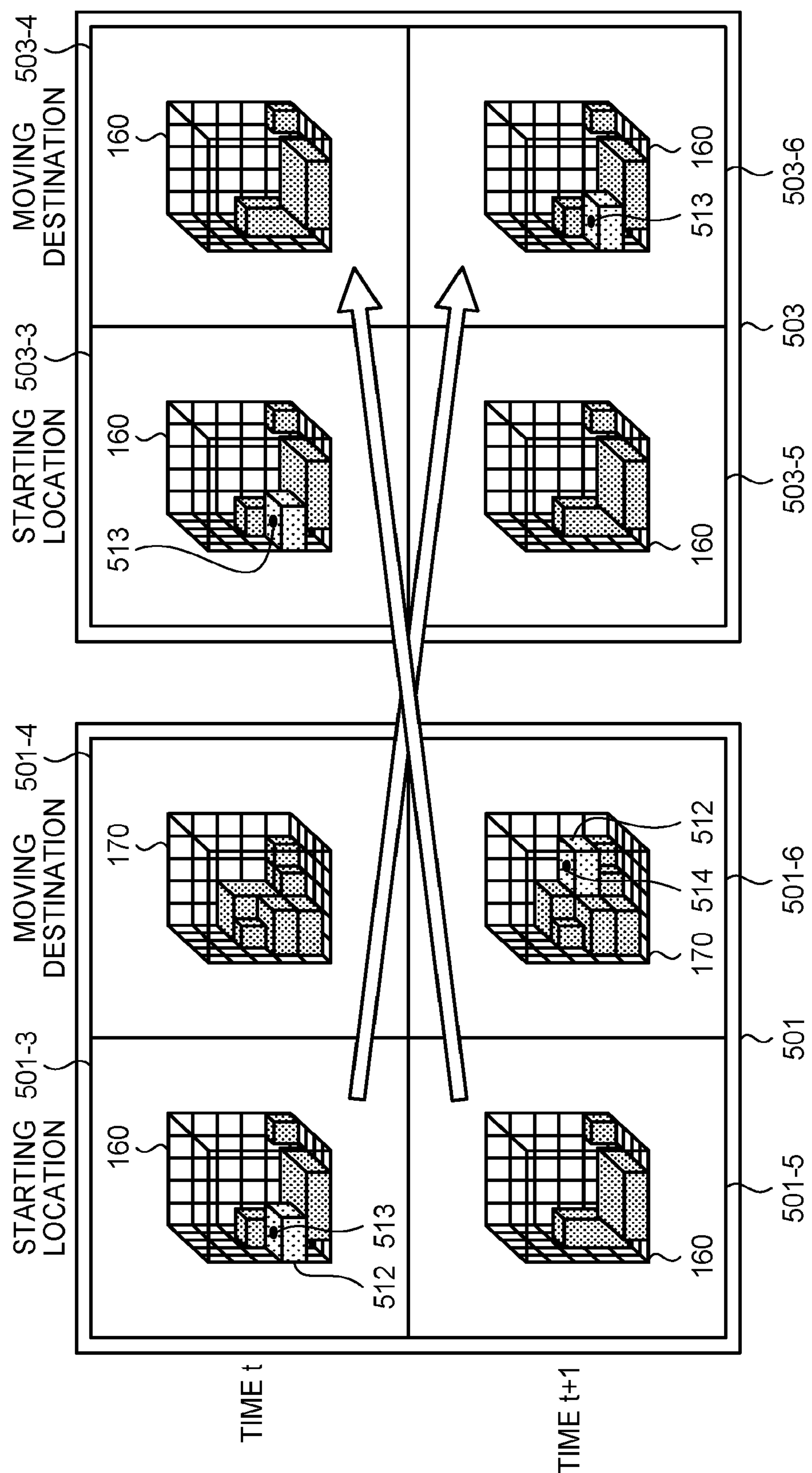
FIG. 6 is a diagram illustrating another example of augmented data.

FIG. 6 is a diagram illustrating an example of data augmented by data augmentation $f_2$. State information 503 represents data obtained by augmenting the state information 501 by the data augmentation $f_2$. The state information 503 contains data obtained by replacing the state of the container 170 in the state information 501 with the state of the container 160 at opposite time. That is, the state information 503 includes third state information 503-3, fourth state information 503-4, fifth state information 503-5, and sixth state information 503-6 as follows:

Third state information 503-3: the same as the third state information 501-3 (with no replacement);

Fourth state information 503-4: state information replaced with the fifth state information 501-5;

Fifth state information 503-5: the same as the fourth state information 501-4 (with no replacement); and Sixth state information 503-6: state information replaced with the third state information 501-3.

As a result, the state information 503 indicates that the robot 100 grasps the object 512 in the container 160 at the grasp position 513 and packs the object 512 in the container 160 at the packing position 513. The state information 503 contains simulation data of the same states of the container as the starting location (container 160) and the container as the moving destination (container 170) except for the object to be packed. Thus, the state information 503 can be used as the experience data in reinforcement learning.

Figure 7:
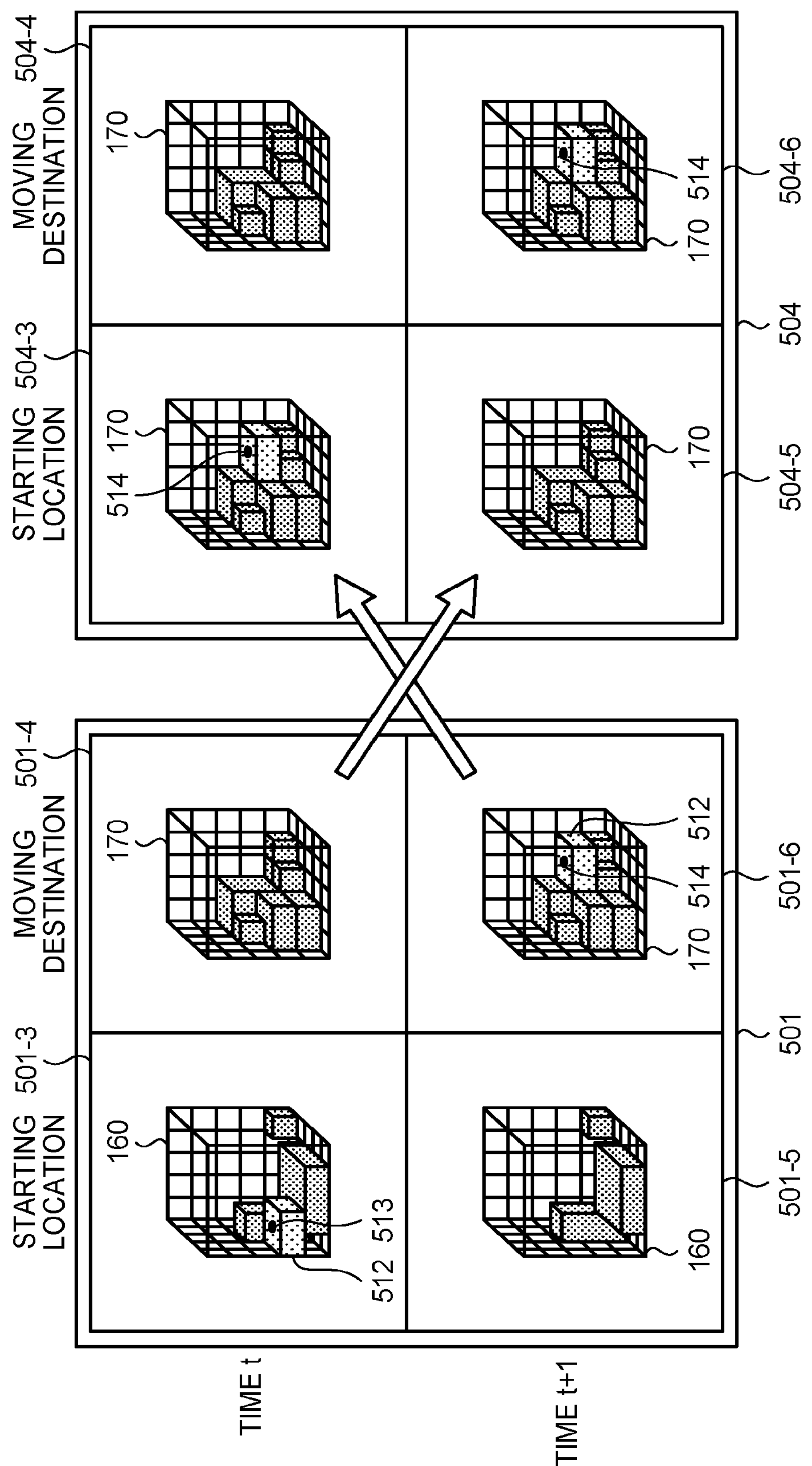
FIG. 7 is a diagram illustrating another example of augmented data.

FIG. 7 is a diagram illustrating an example of data augmented by data augmentation $f_3$. State information 504 represents data obtained by augmenting the state information 501 by the data augmentation $f_3$. The state information 504 represents data obtained by replacing the state of the container 160 in the state information 501 with the state of the container 170 at opposite time. That is, the state information 504 includes third state information 504-3, fourth state information 504-4, fifth state information 504-5, and sixth state information 504-6 as follows:

Third state information 504-3: state information replaced with the third state information 501-3;

Fourth state information 504-4: the same as the fifth state information 501-5 (with no replacement);

Fifth state information 504-5: state information replaced with the fourth state information 501-4; and Sixth state information 504-6: the same as the third state information 501-3 (with no replacement).

As a result, the state information 504 indicates that the robot 100 grasps the object 512 in the container 170 at the grasp position 514 and packs the object 512 in the container 170 at the packing position 514. The state information 504 contains simulation data of the same states of the container as the starting location (container 160) and the container as the moving destination (container 170) except for the object to be packed. Thus, the state information 504 can be used as the experience data in reinforcement learning.

When the reward for a successful grasping and packing is calculated according to the volume or weight of the object 161, it is not necessary to change the reward value after performing data augmentation. The reward after the data augmentation may be, however, not preferable depending on definitions of the reward. In such a case, the state information after the data augmentation may be input to the reward determiner 211 again, to calculate a reward $r_t$.

The above has described an exemplary learning process when the container 160 and the container 170 have the same size. The following will describe how to deal with the container 160 and the container 170 of different sizes. In the following an example that the container 170 is larger in size than the container 160 is described, however, the same applies to an example that the container 170 is smaller in size than the container 160.

When the container 170 is larger than the container 160, a first processing method is to correct at least one of the state information of the container 160 and the state information of the container 170 acquired by the acquirer 201 such that the container 160 and the container 170 have the same size. The acquirer 201 may correct the state information of the container 170 by trimming to output the state information including the same size as the container 160, or may correct the state information of the container 160 by padding to output the state information including the same size as the container 170.

In trimming, the acquirer 201 may generate a plurality of pieces of state information by trimming the state information at various trimming positions, and the inferrer 202 may output the grasp position and pose and the packing position and pose according to each of the pieces of state information. The inferrer 202 selects a set of a grasp position and pose and a packing position and pose from among two or more grasp positions/poses and two or more packing positions/poses by a predefined method in the end. For example, the inferrer 202 selects a set of a grasp position and pose and a packing position and pose with a largest output of the neural network (an output value of the action value function Q). The generation controller 220 generates the experience data using the state information trimmed at the trimming positions corresponding to the grasp position and pose and the packing position and pose as selected by the inferrer 202.

A second processing method when the container 170 is larger than the container 160 is such that the augmenter 222 performs trimming and padding of the state information at the time of data augmentation. To replace the state information of the container as the starting location (for example, the container 160) with the state information of the container as the moving destination (for example, the container 170) by data augmentation, the augmenter 222 trims the two pieces of state information to allow them to match in size. For this purpose, the trimming position is adjusted so that the state information after the trimming includes the object to be packed.

To replace the state information of the container as the moving destination (for example, the container 170) with the state information of the container as the starting location (for example, the container 160) by data augmentation, the augmenter 222 performs padding of the two pieces of state information to allow them to match in size. Examples of a padding method include zero padding by inserting zero, padding by repeatedly replicating values around the state information, padding by folding back inside state information to outside, and padding by generating and inserting random values.

The second processing method can be interpreted as a method of correcting the state information as a source of replacement so as to match with the state information as a destination of replacement in size. The method of correcting the state information as a source of replacement so as to match with the state information as a destination of replacement in size may be also applied to the first processing method that the acquirer 201 corrects the state information.

The present embodiment has described a data augmentation method of replacing the state information at time t and the state information at time t+1 with each other. Such data augmentation can be combined with a data augmentation method for use in image recognition. For example, after performing data augmentation by the above method, the augmenter 222 may additionally perform inversion, affine transformation, and noise addition to the state information such as an image and a depth image for data augmentation. However, such data augmentation may change the grasp position and pose and the packing position and pose. In such a case, the grasp position and pose and the packing position and pose is additionally subjected to a correction process.

Thus, the information processing device of the first embodiment can generate two or more pieces of experience data for use in reinforcement learning from a single object grasping and packing motion. This makes it possible to improve learning efficiency in reinforcement learning with respect to the number of grasping and packing tries.

Second Embodiment

As with the first embodiment, a second embodiment will mainly describe a robot system that controls a robot having a function of grasping and moving an article (an exemplary object) and packing it in a container (an exemplary moving destination).

In the first embodiment, the information processing device learns the policy for deciding both of the grasp position and pose with respect to the object to be packed and the packing position and pose. However, learning may be unnecessary if the grasp position and pose with respect to the object to be packed can be easily decided. In such a case, due to learning a policy for deciding only the packing position and pose, it is possible to learn an efficient packing policy with a higher occupancy rate or a shorter packing time to be executable by the robot more efficiently than the first embodiment.

The configuration of the robot system according to the second embodiment is the same as that in FIG. 1, therefore, a description thereof will be omitted herein. The second embodiment is different from the first embodiment in the functions of the information processing device included in the robot system.

Figure 8:
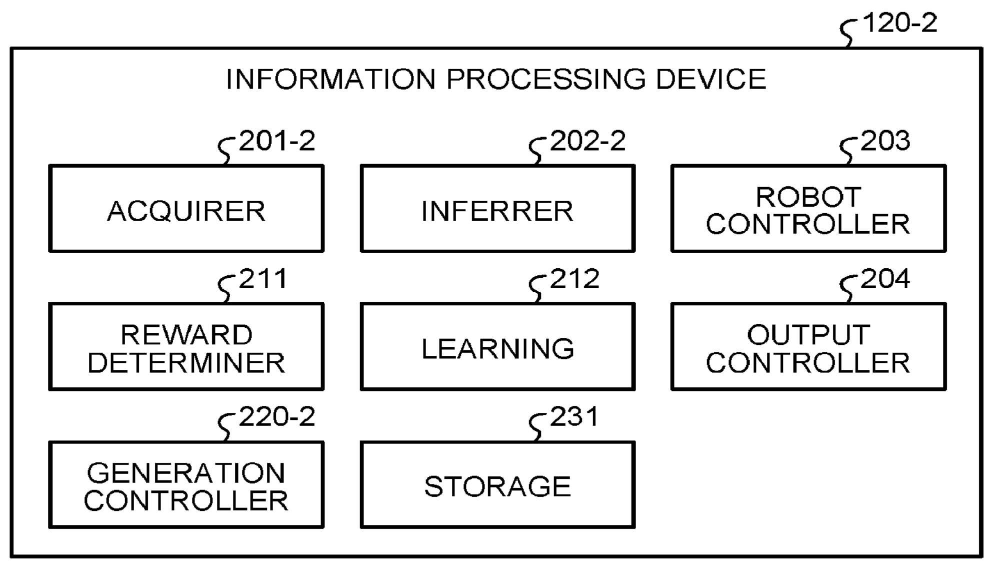
FIG. 8 is a block diagram of an information processing device according to a second embodiment.

FIG. 8 is a block diagram illustrating an exemplary configuration of an information processing device 120-2 according to the second embodiment. As illustrated in FIG. 8, the information processing device 120-2 includes an acquirer 201-2, an inferrer 202-2, a robot controller 203, an output controller 204, a reward determiner 211, a generation controller 220-2, a learning 212, and a storage 231.

Figure 9:
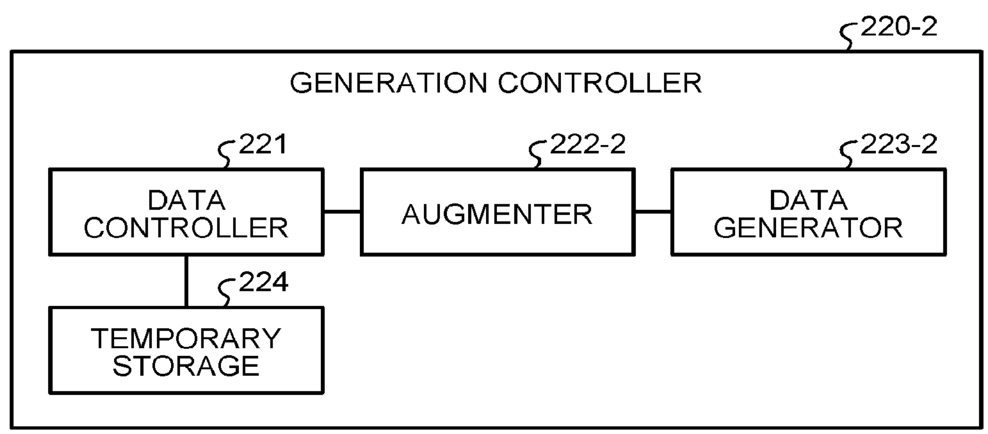
FIG. 9 is a block diagram of a generation controller according to the second embodiment.

FIG. 9 is a block diagram illustrating an exemplary functional configuration of the generation controller 220-2. As illustrated in FIG. 9, the generation controller 220-2 includes a data controller 221, an augmenter 222-2, a data generator 223-2, and a temporary storage 224.

The second embodiment is different from the first embodiment in the functions of the acquirer 201-2, the inferrer 202-2, and the augmenter 222-2, and the data generator 223-2 in the generation controller 220-2. The rest of the elements and functions are the same as those of the first embodiment in FIG. 2 and FIG. 3, so that they are denoted by the same reference numerals, and a description thereof will be omitted herein.

In learning the policy for deciding only the packing position and pose, the acquirer 201-2 acquires state information $s^{(1)}_t$ of the container 160 at time t and state information $s^{(o)}_t$ of the object to be packed at time t. The state information $s^{(o)}_t$ of the object to be packed includes information related to a shape of the object to be packed and a grasp pose.

The inferrer 202-2 decides the grasp position and pose and the packing position and pose from an input of the state information $s^{(o)}_t$ of the object to be packed and the state information $s^{(2)}_t$ of the container 170. That is, the inferrer 202-2 decides an action $a_t$ by inputting, to the action value function $Q(s_t, a_t)$ configured by the neural network, the state $s_t=(s^{(o)}_t, s^{(2)}_t)$ obtained by concatenating the state information $s^{(o)}_t$ of the object to be packed with the state information $s^{(2)}_t$ of the container 170. In the present embodiment, the action $a_t$ corresponds to the packing position and pose $a^{(2)}_t$ on a one-to-one basis.

The augmenter 222-2 performs data augmentation of the data $u_t$ in accordance with $f_4$ represented by the following expression (8):

$$f_4(u_t)=(s^{(2)}_{t+1}, s^{(1)}_{t+1}, a^{(2)}_t, a^{(1)}_t, r_{t+1}, s^{(2)}_t, s^{(1)}_t). \quad (8)$$

The augmenter 222-2 outputs the augmented data $f_4(u_t)$ to the data generator 223-2 together with the data $u_t$ before being augmented.

The data generator 223-2 generates and outputs experience data $x=(s_t, a_t, r_{t+1}, s_{t+1})$ from the input data from the augmenter 222-2. In response to an input of the data $u_t=(s^{(1)}_t, s^{(2)}_t, a^{(1)}_t, a^{(2)}_t, r_{t+1}, s^{(1)}_{t+1}, s^{(2)}_{t+1})$ from the augmenter 222-2, the data generator 223-2 defines $s_t=(s^{(o)}_t, s^2)_t)$, $s_{t+1}=(s^{(o)}_t+1, s^2)_{t+1})$, and defines the action $a_t$ as a value uniquely specifying the packing position and pose $a^{(2)}_t$, to generate the experience data x.

In response to an input of $f_4(u_t)$ from the augmenter 222-2, the data generator 223-2 defines $s_t=(s^{(o)}_t, s^{(1)}_{t+1})$, $s_{t+1}=(s^{(o)}_{t+1}, s^{(1)}_t)$, and defines the action $a_t$ as a value uniquely specifying the packing position and pose $a^{(1)}_t$ to generate the experience data.

Thus, the information processing device of the second embodiment can generate two pieces of experience data for use in reinforcement learning from a single object packing motion. This enables improvement in learning efficiency of reinforcement learning with respect to the number of packing tries.

Third Embodiment

The data augmentation methods as in the above embodiments are also applicable to learning other than learning of a motion control over the robot that moves the object. The third embodiment will describe an example of applying such methods to reinforcement learning of an action policy for an agent such as an unmanned carrier in a grid world.

Figure 10:
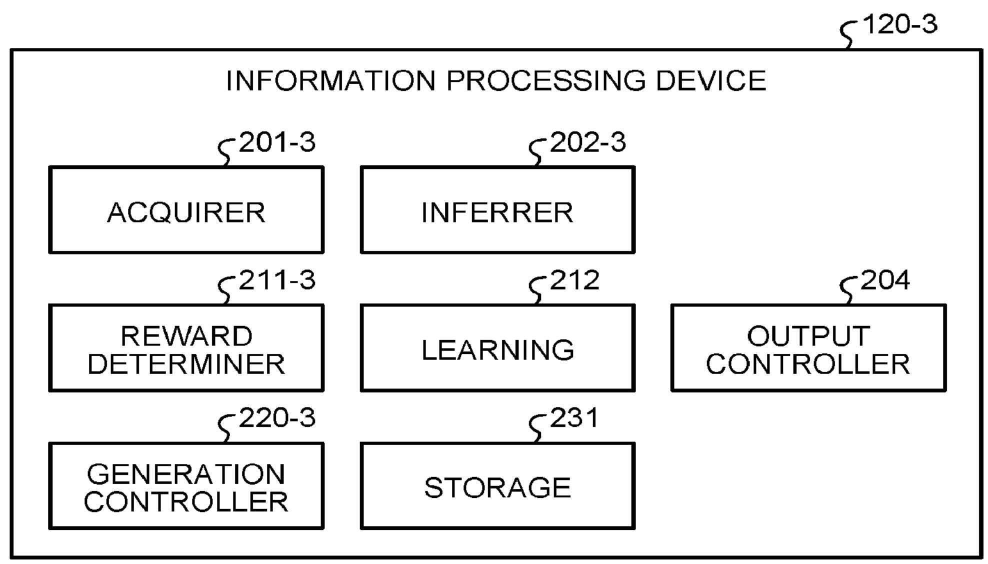
FIG. 10 is a block diagram of an information processing device according to a third embodiment.

FIG. 10 is a block diagram illustrating an exemplary configuration of an information processing device 120-3 according to the third embodiment. As illustrated in FIG. 10, the information processing device 120-3 includes an acquirer 201-3, an inferrer 202-3, an output controller 204, a reward determiner 211-3, a generation controller 220-3, a learning 212, and a storage 231.

Figure 11:
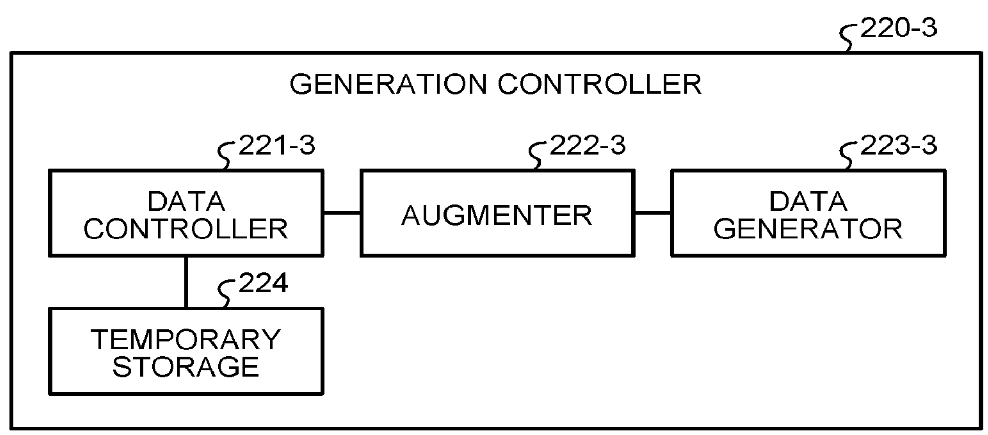
FIG. 11 is a block diagram of a generation controller according to the third embodiment.

FIG. 11 is a block diagram illustrating an exemplary functional configuration of the generation controller 220-3. As illustrated in FIG. 11, the generation controller 220-3 includes a data controller 221-3, an augmenter 222-3, a data generator 223-3, and a temporary storage 224.

The third embodiment is different from the first embodiment in excluding the functions of the acquirer 201-3, the inferrer 202-3, the reward determiner 211-3, and the elements of the generation controller 220-3 except for the temporary storage 224, and the elements of the robot controller 203. The rest of the elements and functions are the same as those of the first embodiment in FIG. 2 or FIG. 3, so that they are denoted by the same reference numerals, and a description thereof will be omitted herein.

The acquirer 201-3 acquires the state information for use in inference. For example, the acquirer 201-3 acquires a state $s_t$ (an exemplary first state information) at time t in the grid world. The state information $s_t$ includes, for example, a start position of the agent, a goal position of the agent, a position of an obstacle, and a current position of the agent in the grid world.

The inferrer 202-3 decides or infers a next moving direction of the agent in the grid world from the state $s_t$. As with the inferrer 202 according to the first embodiment, the inferrer 202-3 can perform inference using various reinforcement learning algorithms. For example, in inferring by the DQN, the inferrer 202-3 inputs the state $s_t$ to the action value function $Q(s_t, a_t)$ configured by the neural network, and decides an action $a_t$ by the expression (1) as above. Examples of the action $a_t$ include the moving direction of the agent.

The reward determiner 211-3 determines, for example, a decrease in a distance to the goal as a reward.

The data controller 221-3 outputs, to the augmenter 222-3, the data $u_t$ for use in generating experience data represented by the following expression (9):

$$u_t=(s_t,a_t,r_{t+1},s_{t+1}). \quad (9)$$

Each term in the data $u_t$ signifies the following information:

First term: state information at time t

Second term: action (moving direction) at time t

Third term: reward at time t+1; and

Fourth term: state information at time t+1.

The augmenter 222-3 performs data augmentation of the data $u_t$ in accordance with $f_5$ represented by the following expression (10):

$$f_5(u_t)=(s_{t+1},a'_t,r_{t+1},s_t) \quad (10)$$

An action $a'_t$ is obtained by correcting the direction of the action $a_t$ to an opposite direction. In the case of an action $a_t$ indicating a rightward direction, for example, the action $a'_t$ is corrected to indicate a leftward direction. The augmenter 222-3 also corrects the reward when appropriate. For example, when the reward is defined as a decrease in the distance to the goal, the augmenter 222-3 corrects $r_{t+1}$ to $-r_{t+1}$.

In response to occurrence of a collision between the agent and the obstacle at time t+1 or the agent's reaching the goal, the augmenter 222-3 refrains from performing data augmentation.

The data generator 223-3 generates the experience data x represented by the expression (7) as above in response to the input data $u_t$ from the augmenter 222-3 represented by the expression (9). That is, the data generator 223-3 generates the experience data x from the input data in accordance with the following rules:

Defining the first term of the input data as the first term of the experience data;

Defining the second term of the input data as the second term of the experience data;

Defining the third term of the input data as the third term of the experience data; and Defining the fourth term of the input data as the fourth term of the experience data.

The data generator 223-3 can also generate the experience data for the augmented data $f_5(u_t)$ in accordance with the above rules.

Figure 12:
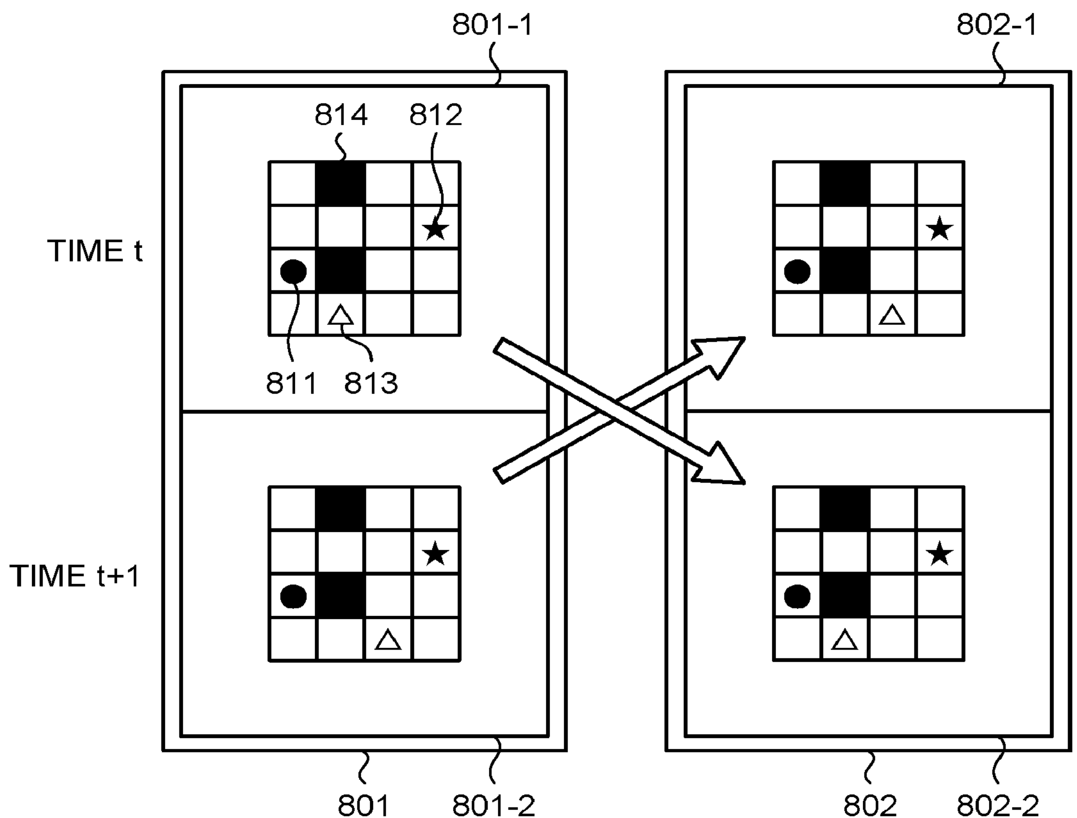
FIG. 12 is a diagram illustrating an exemplary situation in a grid world.

FIG. 12 is a diagram illustrating a state $s_t$ at time t and a state $s_{t+1}$ at time t+1 in the grid world by way of example. State information 801 represents a state that is actually obtained through an agent's action. The state information 801 includes a start position 811, a goal position 812, a current position 813 of the agent, and an obstacle's position 814.

Specifically, the state information 801 includes first state information 801-1 and second state information 801-2 as follows:

First state information 801-1: a state of the grid world at time t; and

Second state information 801-2: a state of the grid world at time t+1.

Each of the start position 811, the goal position 812, and the obstacle's position 814 are set to a randomly varied value upon each try.

In the present embodiment, the inferrer 202-3 determines an adjacent grid to which the agent moves (moving direction) by one action. The agent aims to reach the goal through a minimum number of motions without contacting the obstacle. In other words, in the present embodiment a subject of inference is a moving route of the agent in the grid world. A subject related to the moving route is, for example, the agent itself.

In the present embodiment, the data generator 223-3 generates state information 802 representing the state information 801 with the state at time t and the state at time t+1 replaced with each other.

The state information 802 represents data obtained by augmenting the state information 801 by the data augmentation $f_5$. The state information 802 corresponds to the state information 801 with time t and time t+1 in each state replaced with each other. That is, the state information 802 includes first state information 802-1 and second state information 802-2 as follows:

First state information 802-1: the state information replaced with the second state information 801-2; and Second state information 802-2: the state information replaced with the first state information 801-1.

The state information 801 indicates that the agent has moved to a right-side grid. The state information 802 is simulation data of the agent's action, i.e., moving from a right-side grid to a left-side grid.

Thus, according to the third embodiment, the data generator 223-3 can generate two or more pieces of experience data from a single action in the grid world. This makes it possible to enhance learning efficiency in reinforcement learning with respect to the number of actions.

According to the first to the third embodiments as scribed above, it is possible to improve the learning efficiency.

Figure 13:
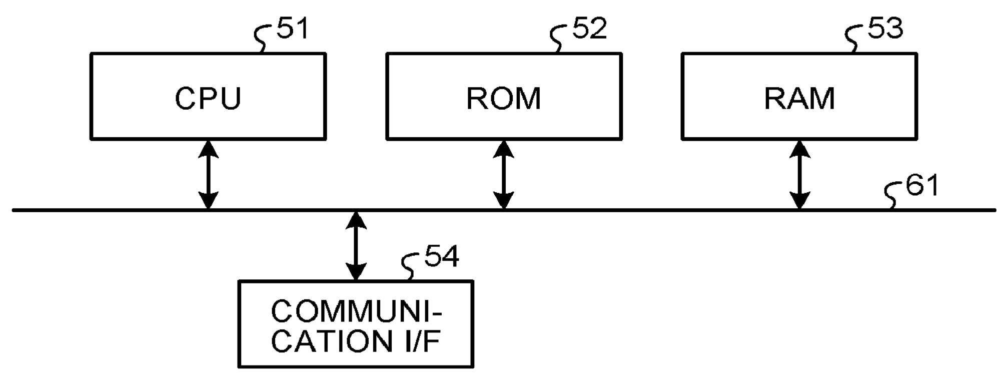
FIG. 13 is a hardware configuration diagram of the information processing device according to any of the first to the third embodiments.

Next, the following will describe a hardware configuration of the information processing device according to any of the first to the third embodiments with reference to FIG. 13. FIG. 13 is an explanatory diagram illustrating an exemplary hardware configuration of the information processing device of any of the first to the third embodiments.

The information processing devices according to the first to the third embodiments each include a control device such as a CPU 51, storages such as a read only memory (ROM) 52 and a random access memory (RAM) 53, a communication interface (I/F) 54 connected to a network to perform communication, and a bus 61 connecting the respective elements.

Computer programs to be executed by the information processing device according to any of the first to the third embodiments are incorporated and provided in the ROM 52, for example.

The computer programs to be executed by the information processing device according to any of the first to the third embodiments may be recorded in an installable or executable file format on a computer-readable recording medium such as a compact disk read only memory (CD-ROM), a flexible disk (FD), a compact disk recordable (CD-R), and a digital versatile disk (DVD), and be provided as a computer program product.

The computer programs to be executed by the information processing device according to any of the first to the third embodiments may be stored in a computer connected to a network such as the Internet and provided by being downloaded via the network. Furthermore, the computer programs to be executed by the information processing device according to any of the first to the third embodiments may be provided or distributed via a network such as the Internet.

The computer programs to be executed by the information processing device according to any of the first to the third embodiments may cause a computer to function as the respective elements of the information processing device described above. In this computer, the CPU 51 can load and execute the computer programs from the computer-readable recording medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:

processing circuitry configured to:

acquire one or more pieces of first state information and one or more pieces of second state information, the first state information representing a state of each of one or more subjects at time t1, the one or more subjects each including a first region as a starting location of an object that a robot moves and a second region as a moving destination of the object, the second state information representing a state of each of the one or more subjects at time t2 after the time t1, the first state information and the second state information being obtained from one action of the robot from the time t1 to the time t2;

generate learning data for use in reinforcement learning of a machine learning model for use in inference of an action of the robot; and perform the reinforcement learning of the machine learning model using the learning data, the learning data including first learning data and second learning data, the first learning data including the one or more pieces of first state information and the one or more pieces of second state information, the second learning data including:

the one or more pieces of first state information at least part of which is replaced with any of the one or more pieces of the second state information, and the one or more pieces of second state information at least part of which is replaced with any of the one or more pieces of first state information, wherein the processing circuitry is configured to control actions of the robot based on an output of the machine learning model.

2. The device according to claim 1, wherein the first state information includes third state information representing a state of the first region at the time t1, and fourth state information representing a state of the second region at the time t1, and the second state information includes fifth state information representing a state of the first region at the time t2, and sixth state information representing a state of the second region at the time t2.

3. The device according to claim 2, wherein the processing circuitry is further configured to generate the second learning data including:

the third state information replaced with the sixth state information;

the fourth state information replaced with the fifth state information;

the fifth state information replaced with the fourth state information; and the sixth state information replaced with the third state information.

4. The device according to claim 2, wherein the processing circuitry is further configured to generate the second learning data including:

the fourth state information replaced with the fifth state information; and the sixth state information replaced with the third state information.

5. The device according to claim 2, wherein the processing circuitry is further configured to generate the second learning data including:

the third state information replaced with the sixth state information; and the fifth state information replaced with the fourth state information.

6. The device according to claim 2, wherein the first region and the second region differ in size, and the processing circuitry is further configured to correct at least either of the one or more pieces of first state information and the one or more pieces of second state information such that the one or more pieces of first state information and the one or more pieces of second state information represent states of regions having the same size.

7. The device according to claim 2, wherein the first region and the second region differ in size, and the processing circuitry is further configured to:

correct at least either of the one or more pieces of first state information and the one or more pieces of second state information such that the one or more pieces of first state information and the one or more pieces of second state information represent states of regions having the same size, and generate the learning data including the one or more pieces of first state information and the one or more pieces of second state information as corrected.

8. The device according to claim 1, wherein the processing circuitry is further configured to:

determine whether the first state information is replaceable with the second state information, and whether the second state information is replaceable with the first state information, after determining that the first state information is replaceable, replace the first state information with the second state information, and after determining that the second state information is replaceable, replace the second state information with the first state information.

9. The device according to claim 1, wherein the processing circuitry is further configured to perform the reinforcement learning of the machine learning model by using the learning data that is generated.

10. The device according to claim 1, wherein the first state information and the second state information included in the learning data are used to infer the action of the robot.

11. The device according to claim 1, the processing circuitry being connected to a plurality of cameras or sensors, and the first state information is generated from images, captured by at least one of the plurality of cameras or sensors, of an inner state of a container, and the second state information is generated from images, captured by at least another one of the plurality of cameras or sensors, of the moving destination as the second region.

12. An information processing device comprising:

processing circuitry configured to:

acquire one or more pieces of first state information and one or more pieces of second state information, the first state information representing a state of each of one or more subjects at time t1, the one or more subjects each including an agent that moves in region modeled by a grid world, the second state information representing a state of each of the one or more subjects at time t2 after the time t1, the first state information and the second state information being obtained from one action of the agent from the time t1 to the time t2; and generate learning data for use in reinforcement learning of a machine learning model for use in inference of a route of an action of the agent; and perform the reinforcement learning of the machine learning model using the learning data, the learning data including first learning data and second learning data, the first learning data including the one or more pieces of first state information and the one or more pieces of second state information, the second learning data including:

the one or more pieces of first state information at least part of which is replaced with any of the one or more pieces of the second state information, and the one or more pieces of second state information at least part of which is replaced with any of the one or more pieces of first state information, wherein the first state information represents a position of the agent at the time t1, and the second state information represents a position of the agent at the time t2, wherein the processing circuitry is configured to control actions of the agent based on an output of the machine learning model.

13. An information processing method comprising:

acquiring one or more pieces of first state information and one or more pieces of second state information, the first state information representing a state of each of one or more subjects at time t1, the one or more subjects each including a first region as a starting location of an object that a robot moves and a second region as a moving destination of the object, the second state information representing a state of each of the one or more subjects at time t2 after the time t1, the first state information and the second state information being obtained from one action of the robot from the time t1 to the time t2; and generating learning data for use in reinforcement learning of a machine learning model for use in inference of an action of the robot; and performing the reinforcement learning of the machine learning model using the learning data, the learning data including first learning data and second learning data, the first learning data including the one or more pieces of first state information and the one or more pieces of second state information, the second learning data including:

the one or more pieces of first state information at least part of which is replaced with any of the one or more pieces of the second state information, and the one or more pieces of second state information at least part of which is replaced with any of the one or more pieces of first state information, wherein the method further includes controlling actions of the robot based on an output of the machine learning model.

14. A computer program product comprising a non-transitory computer-readable medium including programmed instructions, the instructions causing a computer to execute:

acquiring one or more pieces of first state information and one or more pieces of second state information, the first state information representing a state of each of one or more subjects at time t1, the one or more subjects each including a first region as a starting location of an object that a robot moves and a second region as a moving destination of the object, the second state information representing a state of each of the one or more subjects at time t2 after the time t1, the first state information and the second state information being obtained from one action of the robot from the time t1 to the time t2; and generating learning data for use in reinforcement learning of a machine learning model for use in inference of an action of the robot; and performing the reinforcement learning of the machine learning model using the learning data, the learning data including first learning data and second learning data, the first learning data including the one or more pieces of first state information and the one or more pieces of second state information, the second learning data including:

the one or more pieces of first state information at least part of which is replaced with any of the one or more pieces of the second state information, and the one or more pieces of second state information at least part of which is replaced with any of the one or more pieces of first state information, wherein the instructions further cause the computer to execute controlling actions of the robot based on an output of the machine learning model.

* * * * *